(12) United States Patent
Fabre et al.

(10) Patent No.: US 9,816,385 B2
(45) Date of Patent: Nov. 14, 2017

(54) CONTROL DEVICE FOR THE PITCH OF BLADES, AND PROPELLER

(71) Applicant: SNECMA, Paris (FR)

(72) Inventors: Adrien Jacques Philippe Fabre, Montrouge (FR); Sebastien Emile Philippe Tajan, Sucy en Brie (FR); Christophe Paul Jacquemard, Hericy (FR); Sarah Chartier, Paris (FR)

(73) Assignee: SNECMA, Paris (FR)

( * ) Notice: Subject to any disclaimer, the term of this patent is extended or adjusted under 35 U.S.C. 154(b) by 470 days.

(21) Appl. No.: 14/340,111

(22) Filed: Jul. 24, 2014

(65) Prior Publication Data

US 2015/0030450 A1    Jan. 29, 2015

(30) Foreign Application Priority Data

Jul. 24, 2013 (FR) ..................... 13 57319

(51) Int. Cl.
*F01D 7/00* (2006.01)
*B64C 11/06* (2006.01)
*B64D 27/00* (2006.01)

(52) U.S. Cl.
CPC .............. *F01D 7/00* (2013.01); *B64C 11/06* (2013.01); *B64D 2027/005* (2013.01); *F05D 2260/79* (2013.01); *Y02T 50/66* (2013.01); *Y02T 50/672* (2013.01)

(58) Field of Classification Search
CPC . F01D 7/00; F01D 5/30; F01D 5/3053; F05D 2260/74; F05D 2260/79; B64C 11/06; B64D 2027/005; Y02T 50/66; Y02T 50/672

See application file for complete search history.

(56) References Cited

U.S. PATENT DOCUMENTS

| 2,017,505 A | 10/1935 | Meon |
| 2012/0294718 A1* | 11/2012 | Thornton .............. B64C 11/306 416/147 |
| 2014/0241884 A1* | 8/2014 | Schmaling .............. B64C 27/82 416/134 A |

FOREIGN PATENT DOCUMENTS

| DE | 42 03 205 A1 | 8/1993 |
| GB | 569962 A | 6/1945 |

OTHER PUBLICATIONS efunda, Properties of Steel, https://www.efunda.com/materials/alloys/alloy_home/steels_properties.cfm.*

(Continued)

*Primary Examiner* — Nathaniel Wiehe
*Assistant Examiner* — Elton Wong
(74) *Attorney, Agent, or Firm* — Oblon, McClelland, Maier & Neustadt, L.L.P.

(57) ABSTRACT

A control device of the pitch of blades of a rotor of a propeller is provided. The control device includes: a radial shaft; a pivot connected to the blade, the rotation of the radial shaft driving the rotation of the pivot for the modification of the pitch of the blade; an insert fixed rigidly to the pivot so as to block their relative displacement, the radial shaft being configured to drive in rotation the insert; at least one peg passing through the insert and the pivot for transmission of the rotation of the insert to the pivot; and a heat insulation element arranged between the insert and the pivot, whereof the thermal conductivity is less than the thermal conductivity of the pivot and of the radial shaft.

11 Claims, 5 Drawing Sheets

(56) References Cited

OTHER PUBLICATIONS

French Preliminary Search Report dated Jun. 6, 2014 in Patent Application No. 1357319 (with English translation of categories of cited documents).

* cited by examiner

CONTROL DEVICE FOR THE PITCH OF BLADES, AND PROPELLER

FIELD OF THE INVENTION

The invention relates to a control device of the pitch of blades of a rotor of a propeller, as well as a propeller comprising such a device.

PRESENTATION OF PRIOR ART

Turbine engine propellers comprising at least one rotor and blades of variable geometric pitch are known from the prior art.

The geometric pitch is the angle formed by the line of the profile of the blade and the plane of rotation of the propeller.

For this purpose, as illustrated in FIGS. 1 and 2, a device comprising a radial shaft 102 linked to the blade 100 by a pivot 105 is disclosed.

Splines present on the radial shaft 102 cooperate with complementary splines 107 present on the inner surface of the pivot 105 to transmit rotation from the radial shaft 102 to the pivot 105.

A link rod 103 with axial displacement controls rotation of the radial shaft 102.

A jack 104 controls axial displacement of the link rod 103, and regulates the pitch of all the blades.

In general, the pivot is made of titanium, and the radial shaft is made of steel or an alloy based on nickel. This results from the pivot being in a cold zone (temperature below 200° C.), whereas the radial shaft is in a warm zone, which is the ejection vein of the turbine (temperature above 300° C. or even 450° C.)

The splines allowing transmission of the rotation must support radial and azimuthal displacements (deviation) between the pivot and the radial shaft, resulting from different dilations as a function of temperature, and misalignments, due to the deformations under the thrust load.

These displacements cause wear of the pivot and the radial shaft, the wear being present mainly on the pivot due to its composition of titanium.

Also, it is paramount to limit thermal transfers between the radial shaft and the pivot linked to the architecture of the engine (propeller downstream of the turbine and hot gases). The radial shaft, located in a warm zone, transmits its heat to the pivot, which is prejudicial for operation of the pivot, rolling, and the blade foot which is generally made of composite material.

PRESENTATION OF THE INVENTION

In response to these needs, the invention proposes a device for controlling the pitch of the blades of a rotor of a propeller, comprising:
  a radial shaft,
  a pivot connected to the blade, the rotation of the radial shaft driving the rotation of the pivot for modification of the pitch of the blade,
characterised in that it comprises:
  an insert fixed rigidly to the pivot so as to block their relative displacement, the radial shaft being configured to drive the insert in rotation,
  at least one peg passing through the insert and the pivot for transmission of the rotation from the insert to the pivot,
  a heat insulation element arranged between the insert and the pivot, whereof the thermal conductivity is less than the thermal conductivity of the pivot and of the radial shaft.

The invention is advantageously completed by the following characteristics, taken singly or in any their technically possible combination:
  the insert is fixed to the pivot by means of at least one screw;
  the heat insulation element encloses the circumference of at least one part of the peg or of the screw;
  the heat insulation element consists in an air gap;
  the air gap has a height less than or equal to around 1 mm;
  the heat insulation element consists in material whereof the thermal conductivity is less than the thermal conductivity of the pivot and of the radial shaft;
  the heat insulation element comprises an annular piece comprising:
    a central opening, for passage of the radial shaft;
    one or more circumferential openings.
  the heat insulation element comprises one or more rings enclosing at least one part of a peg, or of a screw linking the radial shaft to the pivot;
  the material of the insulating element has a thermal conductivity of between 0.01 and 10 W/m/K at 20° C.;
  the material of the insulating element is selected for example, but not limitedly, from graphite or zirconium oxide.

The invention also relates to a propeller comprising a rotor and blades, characterised in that it comprises a control device of the pitch such as described previously.

The invention offers a solution responding both to protection against wear of the splines and the problem of heat insulation of the pivot vis-a-vis the radial shaft.

The solution is advantageous as it needs a change of material limited to what is strictly necessary.

The solution involves reduced bulk and a reduced growth of mass.

Also, the solution has added robustness.

Finally, the solution adapts simply and effectively to control devices of the prior art.

PRESENTATION OF FIGURES

Other characteristics and advantages of the invention will emerge from the following description, which is purely illustrative and non-limiting, and must be considered with respect to the attached drawings, wherein.

DETAILED DESCRIPTION

Control Device of the Pitch of Blades

Figure 1:
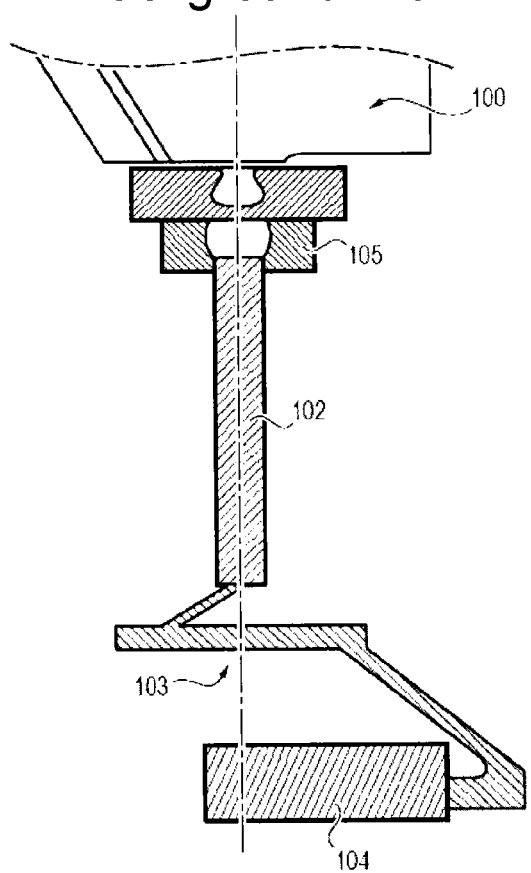
FIGS. 1 and 2 illustrate a control device of the pitch of blades of the prior art.
Figure 2:
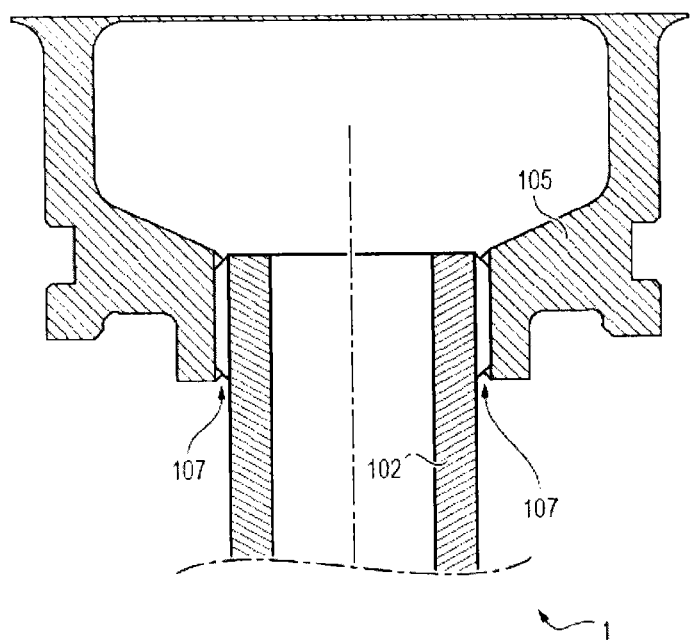
Figure 3:
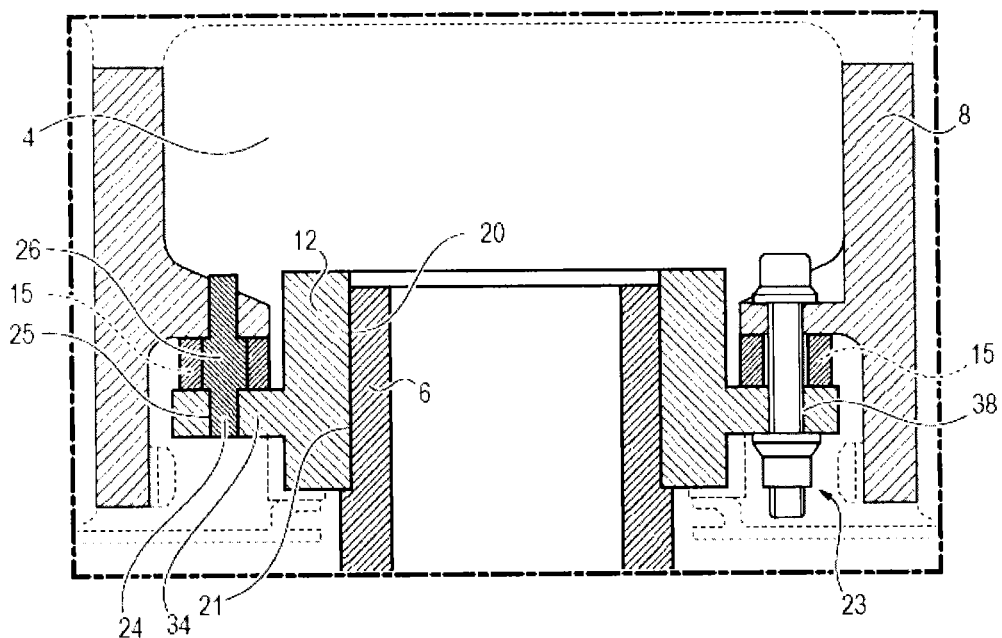
FIG. 3 is a schematic representation of the control device wherein the heat insulation element is a material.

FIG. 3 illustrates an embodiment of a control device 1 of the pitch of blades of a rotor of a propeller.

The device 1 comprises a radial shaft 6, and a pivot 8 connected to the blade.

Conventionally, the foot 4 of the blade is mounted in the pivot 8. For this reason, the pivot 8 comprises especially a cylindrical portion wherein a recess has been made.

The pivot 8 is generally an asymmetrical piece also comprising another recess in its centre to receive the distal end of the radial shaft 6.

The blades are of the type having variable pitch, that is, they can turn about their axes so as to optimise their angular position as a function of the operating conditions of the turbine engine.

Rotation of the radial shaft 6 causes rotation of the pivot 8 about its axe, which produces rotation of the blade about its axis (parallel to the radial axis of the fan).

The orientation of the radial shaft 6 about its own axis therefore modifies the pitch of the blades.

The device 1 comprises also an insert 12 arranged between the pivot 8 and the radial shaft 6.

The insert 12 is an interface piece between the pivot 8 and the radial shaft 6. The insert 12 is an asymmetrical piece, for example of annular type.

The insert 12 is fixed rigidly to the pivot 8 so as to block their relative displacement. In this way, the insert 12 cannot glide or become offset relative to the pivot 8, but in contrast is rigidly assembled with the pivot 8.

The radial shaft 6 is configured to drive the insert 12 in rotation.

In this way, when the pitch of the blades must be modified, a jack (not shown) of the device 1 causes rotation of the radial shaft 6, which drives the insert in rotation and consequently the pivot 8 which is attached to the latter. The foot of the blade, held by the pivot 8, is also driven in rotation.

In an embodiment, the insert 12 is made of steel or an alloy comprising nickel (for example INCONEL). Given that the radial shaft 6 is generally also made of steel or an alloy based on nickel, the contacts between the radial shaft 6 and the insert 12 do not generate problematic wear. Also, because the insert 12 is fixed rigidly to the pivot 8, there are therefore no displacements or friction on the pivot 8, which is therefore preserved.

The insert 12 can also be made of any material whereof the hardness is above 350 HB (Brinell Hardness).

Transmission of the rotation of the radial shaft 6 towards the insert 12 is done via rotation transmission elements. They can be for example splines 20, borne by the insert 12 on its inner surface, which cooperate with complementary splines 21 borne by the radial shaft 6 on its external surface.

Also, the device 1 comprises at least one peg 24, or a plurality of pegs 24, passing through the insert 12 and the pivot 8 for transmission of the rotation of the insert 12 to the pivot 8.

To ensure assembling of the insert 12 with the pivot 8, it is possible to provide at least one screw 23, or a plurality of screws 23, passing through the insert 12 and the pivot 8.

According to a possible realisation, the insert 12 has a fixing flange 34, projecting over the external part of the insert 12.

One end of the pegs 24 passes through takeup holes 25 made in the flange 34 of the insert 12. The holes 25 have a diameter adjusted to the diameter of the pegs 24. Another end of the pegs 24 extends in complementary housings provided in the pivot 8. The central part of the pegs 24 is situated outside the insert 12 and the pivot 8. The pegs 24 are trapped between the insert 12 and the pivot 8.

The ends of the screws 23 as such pass through the fixing holes 38 made in this flange 34 and the pivot 8.

The central part of the screws 23 is situated outside the insert 12 and the pivot 8.

The screws 23 ensure cohesion of the insert 12 and the pivot 8.

Transmission of the rotation torque between the insert 12 and the pivot 8 is done by the pegs 24 which shear. The pegs 24 also allow angular indexation of the insert 12 relative to the pivot 8. The pegs 24 are adjusted precisely in their holes to allow precise angular indexation.

According to an aspect, foolproofing is put in place to prevent confusion during the mounting of the screws 23 and of the pegs 24 in their respective holes.

For this reason, the pegs 24 comprise shoulders 26, and counterbores are provided in the pivot 8, complementary to said shoulders 26.

The fixing holes 38 of the screws having a diameter greater than that of the takeup holes 25 of the pegs, and the screws 23 can have a diameter less than that of the pegs 24, the counterbores present in the pivot and the shoulders 26 ensure the preferred foolproofing.

For example, the pegs 24 and the screws 23 can have a diameter of 6.35 mm, the takeup holes 25 of the pegs 24 a diameter of 6.37 mm and the fixing holes 38 of the screws 23 a diameter of 6.9 mm.

At least one peg 24 is necessary to have precise angular indexation and to transmit the rotation torque.

A plurality of pegs 24, evenly distributed over the circumference of the fixing flange 34, can also be used (for example 2, 3 or 4 screws and pegs).

Similarly, a screw 23 or a plurality of screws 23 can be utilised.

The number of pegs 24 is to be selected as a function of their bulk and their capacity for transmission of couple by shearing.

The number of screws 23 can be equal to or less than the number of pegs 24, given that these screws 23 ensure assembly of the pivot 8 and the insert 12 but transmit no forces other than their grip.

During assembly, the screws 23 are inserted from above (according to the radial axis of the device) and the pegs 24 from below.

Heat Insulation

The device 1 also comprises a heat insulation element 15 arranged between the insert 12 and the pivot 8. The element 15 therefore is interposed between the insert 12 and the pivot 8. In particular, the element 15 can be interposed between the fixing flange 34 and the part of the pivot 8 opposite this flange 34.

The thermal conductivity of the heat insulation element 15 is less than the thermal conductivity of the pivot 8 and of the radial shaft 6. Also, the thermal conductivity of the heat insulation element 15 is less than the thermal conductivity of the insert 12 (in general, the thermal conductivity of the insert 12 is close to that of the radial shaft 6).

By way of example, the insulation element 15 can especially have thermal conductivity up to ten times lower than that of the pivot 8 and the radial shaft 6.

The heat insulation element 15 preserves the pivot 8 of the heat transmitted by the radial shaft 6 which is located in a warm zone of the turbine engine (for example of the order of 300° C.).

The heat insulation element 15 can especially be arranged so as to enclose the circumference of at least one part of the peg 24 or of the screw 23.

In particular, only the ends of the peg 24 or screw 23 are housed in the insert 12 and the pivot 8, whereas the central part of the peg 24 or the screw 23 is enclosed along its circumference by the heat insulation element 15.

In this way, the use of pegs (and screws) decreases the contact surface between the radial shaft and the pivot 8, and therefore heat transfers. Indeed, the pegs and the screws prevent the pivot 8 and the insert 12 (linked to the radial shaft 6) from being directly in contact along their circumference.

Also, the heat insulation element 15 further reduces heat transfers between the radial shaft 6 and the pivot 8.

Heat Insulation by Material

According to a possible embodiment, the heat insulation element 15 is constituted by material whereof the thermal conductivity is less than the thermal conductivity of the pivot 8 and the radial shaft 6.

This material therefore decreases thermal contact resistance of the assembly, given that heat conduction occurs through material having reduced thermal conductivity compared to that of the pivot 8 and the radial shaft 6.

In this embodiment, the heat insulation element 15 typically has a height of between 1 mm and 10 mm (these values being non-limiting).

By way of indication though non-limiting, the pivot 8 for example has thermal conductivity of between 20 and 50 W/m/K at 20° C. (material of steel or titanium type), and the radial shaft 6 has thermal conductivity of between 30 and 60 W/m/K at 20° C. (material of the Inconel type).

Examples of material for the heat insulation element 15 are graphite, whereof the thermal conductivity is around equal to 6 W/m/K at 100° C. (for example laminated shims made of graphic lamellas), and zirconium oxide, whereof the thermal conductivity is around equal to 1.7 W/m/K at 100° C.

In particular, the heat insulation element 15 can especially have thermal conductivity of between 0.01 and 10 W/m/K at 20° C.

Other materials can be used, the choice depending especially on the thermal conductivity of said material relative to that of the pivot 8 and the radial shaft 6, as well as other criteria such as the mass of the material.

Figure 4:
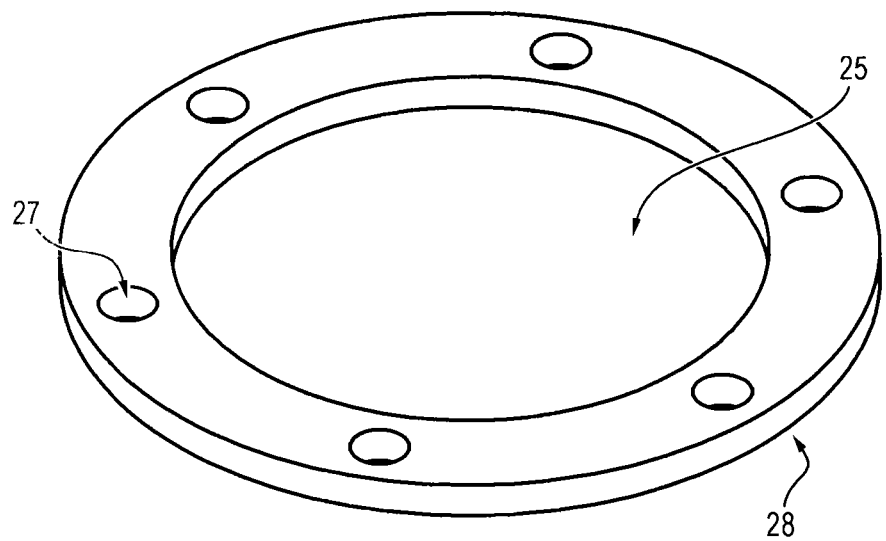
FIG. 4 is a representation of an embodiment of a heat insulation element.

According to an embodiment illustrated in FIG. 4, the heat insulation element 15 comprises an annular piece 28 comprising:
- a central opening 25, for passage of the radial shaft 6;
- one or more circumferential openings 27 for passage of pegs 24, and if needed, screws 23. The openings 27 are distributed over the circumference so as to correspond to the position of the pegs 24, and if needed, of the screws 23.

The integration of the piece 28 into the device 1 is done by cooperation of the central opening 25 with the radial shaft 6 and the circumferential openings 27 with the pegs 24, and if needed, the screws 23.

The contact surface for heat conduction is limited therefore to the contact surface of the peg or pegs 24 with the shaft 6 and the pivot 8 as well as the contact surface of the piece 28 with the pivot 8 and the shaft 6. Yet, as mentioned earlier, the piece 28 reduces heat conduction by its composition.

Figure 5:
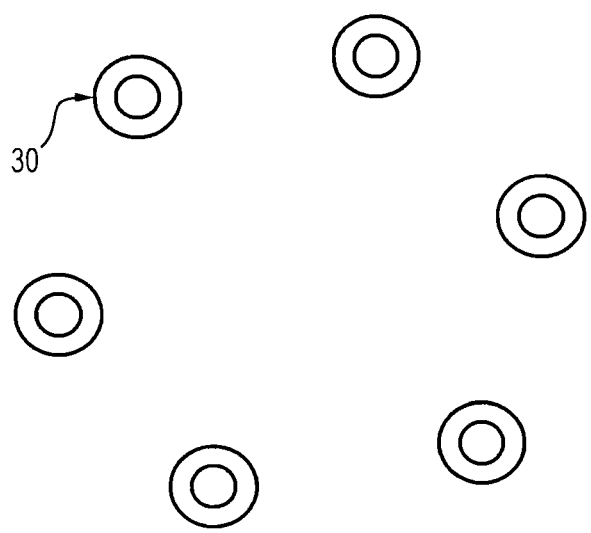
FIG. 5 is a representation of another embodiment of a heat insulation element.

According to another variant illustrated in FIG. 5, the heat insulation element 15 comprises one or more annular pieces 30. The annular pieces 30 are distinct, and do not belong to a common assembly. The annular pieces 30 enclose at least one part of the peg or pegs 24, and if needed at least one part of the screw 23 (or of the screws 23), such as in particular the central part of the peg 24 (respectively of the screw 23) not housed in the insert 12 and the pivot 8.

Heat Insulation Via an Air Gap

Figure 6:
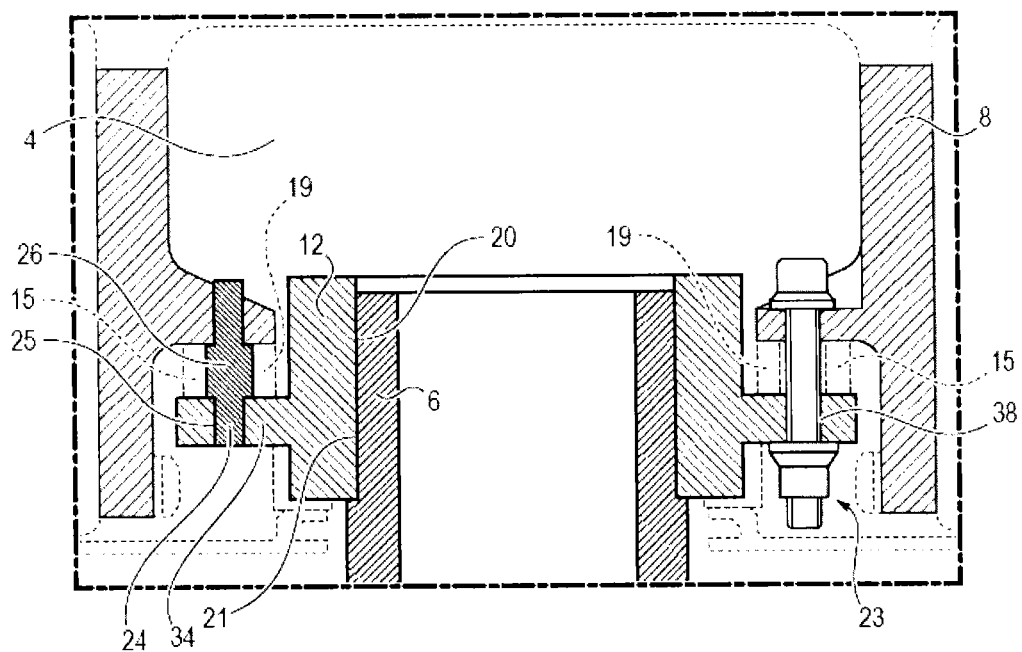
FIG. 6 is a schematic representation of the control device wherein the heat insulation element is an air gap.

In this embodiment illustrated in FIG. 6, the insulation element 15 comprises an air gap 19.

The air gap 19 is introduced between the insert 12 and the pivot 8, and separates the insert 12 from the pivot 8. In particular, it encloses the central part of the peg 24 or the screw 23 which is not introduced to the pivot 8 and the insert 12.

The result of this is a highly reduced contact surface between the pivot 8 and the insert 12 (and therefore the radial shaft 6), which is limited to the sole elements of assemblies such as the pegs 24 or the screws 23.

In the case of the screw 23, a mounting clearance is present between the surfaces of the screw 23 in contact with the pivot 8 according to the axial direction (axis of the propeller), whereas no clearance is present between the surfaces of the screw 23 in contact with the pivot 8 according to the radial direction (axis of the blades).

The air gap 19 has the advantage of minimising heat transfers by conduction by replacing them mostly by convection, much less effective in terms of heat transfer.

The air gap 19 also has the advantage of limiting the necessary height of the heat insulation element 15, and accordingly reduces mechanical stresses on the pegs, which can be subject to flexion in the case of a thick heat insulation element 15.

By way of example, the air gap 19 has a height less than or equal to around 1 mm. This value is a non-limiting example and other heights are applicable according to case.

It is also possible to place a hybrid solution wherein a part of the pegs 24 or the screws 23 is enclosed by a heat insulation element 15 based on material (such as for examples annular pieces such as described previously), while another part of the pegs 24 or the screws 23 is enclosed by a heat insulation element 15 comprising an air gap 19.

The control device of the pitch of the blades applies to a propeller comprising a rotor and blades. In particular, the device applies advantageously to turbine engines of the unducted fan type.

The invention claimed is:

1. A control device of the pitch of blades of a rotor of a propeller, comprising:
   a radial shaft;
   a pivot connected to the blade, a foot of the blade being mounted in the pivot, rotation of the radial shaft driving rotation of the pivot for modifying the pitch of the blade;
   an insert fixed rigidly to the pivot so as to block a relative displacement of the insert with respect to the pivot, the insert being in direct contact with the radial shaft, the radial shaft being configured to drive in rotation the insert via rotation transmission elements borne respectively on an external surface of the radial shaft and an inner surface of the insert, the insert comprising a fixing flange;
   at least one peg passing through the fixing flange of the insert and the pivot for transmission of the rotation of the insert to the pivot; and
   a heat insulation element interposed between the fixing flange of the insert and the pivot, a thermal conductivity of the heat insulation element is less than a thermal conductivity of the pivot and a thermal conductivity of the radial shaft.

2. The device according to claim 1, wherein the insert is fixed to the pivot by at least one screw.

3. The device according to claim 2, wherein the heat insulation element encloses a circumference of at least one part of the peg or of the at least one screw.

4. The device according to claim 1, wherein the heat insulation element consists in an air gap.

5. The device according to claim 4, wherein the air gap has a height of less than or equal to 1 mm.

6. The device according to claim 1, wherein the heat insulation element includes a material in which the thermal conductivity is less than the thermal conductivity of the pivot and the thermal conductivity of the radial shaft.

7. The device according to claim 6, wherein the heat insulation element comprises an annular piece comprising:
a central opening, for passage of the radial shaft, and
one or more circumferential openings.

8. The device according to claim 6, wherein the heat insulation element comprises one or more separate annular pieces enclosing at least one part of the peg or a screw linking the radial shaft to the pivot.

9. The device according to claim 6, wherein the thermal conductivity of the material of the heat insulation element is between 0.01 and 10 W/m/K at 20° C.

10. A propeller comprising a rotor and blades, and a control device of the pitch of the blades according to claim 1.

11. A control device of the pitch of blades of a rotor of a propeller, comprising:
a radial shaft;
a pivot connected to the blade, rotation of the radial shaft driving rotation of the pivot for modifying the pitch of the blade;
an insert fixed rigidly to the pivot so as to block a relative displacement of the insert with respect to the pivot, the radial shaft being configured to drive in rotation the insert;
at least one peg passing through the insert and the pivot for transmission of the rotation of the insert to the pivot; and
a heat insulation element arranged between the insert and the pivot, a thermal conductivity of the heat insulation element is less than a thermal conductivity of the pivot and a thermal conductivity of the radial shaft,
wherein the heat insulation element includes a material in which the thermal conductivity is less than the thermal conductivity of the pivot and the thermal conductivity of the radial shaft, and
wherein the thermal conductivity of the material of the heat insulation element is between 0.01 and 10 W/m/K at 20° C.

* * * * *